P. MARQUA.
Hobby-Horse.
No. 208,531. Patented Oct. 1, 1878.
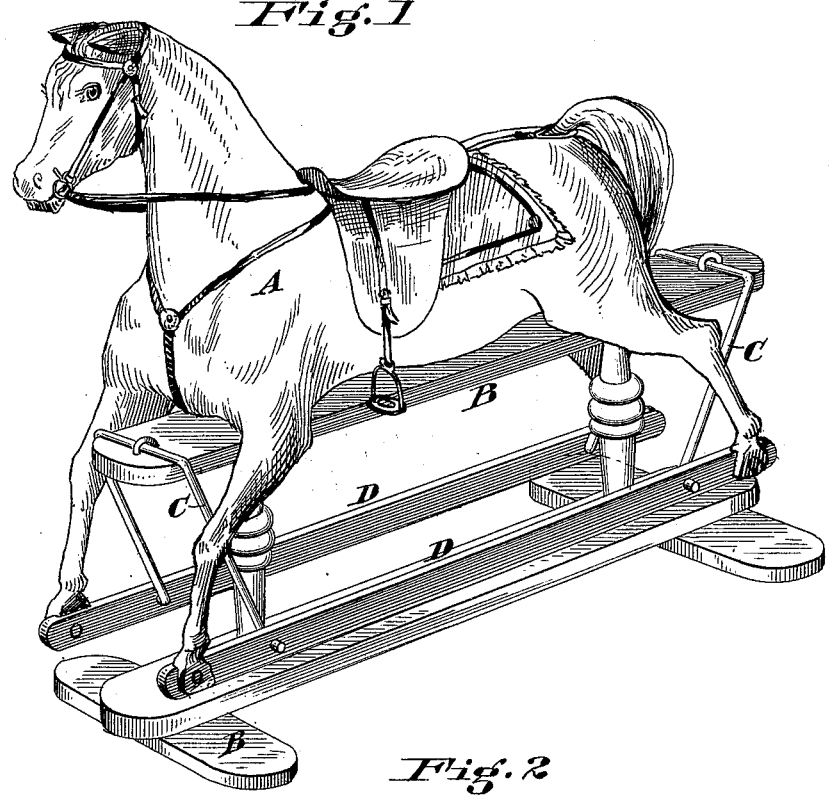
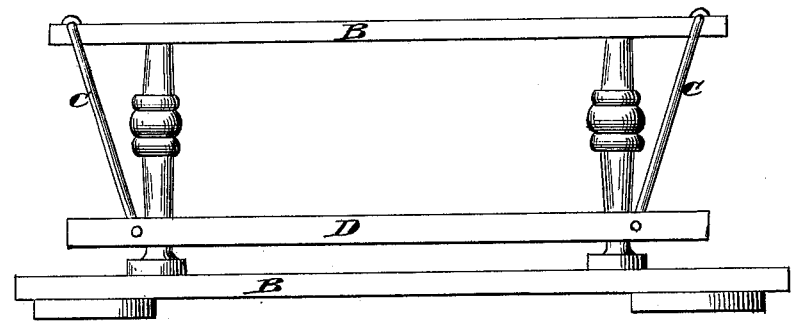

UNITED STATES PATENT OFFICE.

PHILIP MARQUA, OF CINCINNATI, OHIO, ASSIGNOR TO P. J. MARQUA'S SONS.

IMPROVEMENT IN HOBBY-HORSES.

Specification forming part of Letters Patent No. 208,531, dated October 1, 1878; application filed June 29, 1878.

*To all whom it may concern:*

Be it known that I, PHILIP MARQUA, of the city of Cincinnati, county of Hamilton, State of Ohio, have invented a new and useful Improvement in Hobby or Rocking Horses; and I do declare the following to be a full, clear, and exact description thereof, such as will enable others skilled in the art to construct and operate the some, reference being had to the drawings accompanying and forming part of this specification.

My invention relates to that class of hobby-horses designed more particularly for children's use; but it is equally applicable to larger horses to be used for practice or exercise, and has for its object the production of a hobby or exercising horse free from the objectionable features common to those now in use—these objections are noise, wear and tear of carpets, liability to upset, and too much room taken up for operating or packing for shipment—and to produce a motion more nearly approximating the natural one of the horse.

My invention consists in the manner of mounting the wooden body, whereby a motion approximating the natural motion of the live animal is obtained.

My invention further consists in the peculiar arrangement of parts, which enables me to make them "knock down" for shipment.

Figure 1 is a perspective view of my improved hobby-horse, plainly showing my invention. Fig. 2 is a side elevation of the base, showing the position of the links or stirrups and bars.

Upon a base or pedestal, B, of proper height, and constructed so as to pass freely between the legs of the horse in the direction of its length, are hung two inverted U-shaped links or stirrups, C C, hanging and swinging securely in bearings at each end of the top of the base B, with the open end down. These open ends are bent outward, forming hooks or supports for two bars, D D, one on each side of the base B. These bars are so hung upon the links or stirrups C C as to bring the lower ends of the links or stirrups closer together than at the top, for the purpose of producing a swinging rocking motion similar to a "canter." Secured to these bars D D, and straddling the base B, is the body of the horse A, each fore leg fastened to one end of each of the bars D D, and each hind leg to the opposite ends of the bars D D, thus securing the whole together, but leaving the horse free to swing with an easy rocking motion without any fears of upsetting, injury to floors or carpets, and without noise or racket.

The base B is made so as to be taken apart for convenience in packing for shipment, or, in other words, what are called in the trade "knock down."

I am aware that hobby-horses have been made and used with bases, and do not wish to be understood as claiming the use of the base, broadly; but I do verily believe that I am the first to use the stationary base to support a hobby-horse through the medium of the links or stirrups, as shown.

Having thus fully described my invention, what I claim as new, and desire to secure by Letters Patent, is—

1. A hobby or exercising horse pivoted to the lower ends of links or stirrups, whose upper ends vibrate in bearings provided in the upper part of a stationary base or pedestal that extends upward between the legs of the horse in the direction of its length, as and for the purpose set forth, and substantially as described.

2. The combination of the horse-body A, base or pedestal B, stirrups or links C C, and bars D D, as and for the purpose set forth and described.

PHILIP MARQUA.

Witnesses:
WILLIAM DONALDSON,
JOHN J. WRIGHT.